(12) United States Patent
Becourt et al.

(10) Patent No.: US 9,534,609 B2
(45) Date of Patent: Jan. 3, 2017

(54) METHOD FOR PREDICTING A ROTATION FAULT IN THE ROTOR OF A VACUUM PUMP, AND ASSOCIATED PUMPING DEVICE

(75) Inventors: Nicolas Becourt, Annecy (FR); Florent Martin, Annecy (FR); Cecile Pariset, Annecy (FR); Sylvie Galichet, Seynod (FR); Nicolas Meger, Gresy/Aix (FR)

(73) Assignee: ADIXEN VACUUM PRODUCTS, Annecy (FR)

( * ) Notice: Subject to any disclaimer, the term of this patent is extended or adjusted under 35 U.S.C. 154(b) by 496 days.

(21) Appl. No.: 13/380,761

(22) PCT Filed: Jun. 24, 2010

(86) PCT No.: PCT/EP2010/058994
§ 371 (c)(1),
(2), (4) Date: Dec. 23, 2011

(87) PCT Pub. No.: WO2010/149738
PCT Pub. Date: Dec. 29, 2010

(65) Prior Publication Data
US 2012/0209569 A1    Aug. 16, 2012

(30) Foreign Application Priority Data

Jun. 26, 2009   (FR) .................................... 09/03125

(51) Int. Cl.
*F04B 51/00*  (2006.01)
*F04D 19/04*  (2006.01)
(Continued)

(52) U.S. Cl.
CPC .............. *F04D 19/04* (2013.01); *F04B 51/00* (2013.01); *F04D 27/001* (2013.01); *G01H 1/003* (2013.01);
(Continued)

(58) Field of Classification Search
CPC ....................................................... F04B 51/00
(Continued)

(56) References Cited

U.S. PATENT DOCUMENTS

| 5,210,704 A | 5/1993 | Husseiny |
| 5,995,910 A * | 11/1999 | Discenzo ........................ 702/56 |

(Continued)

FOREIGN PATENT DOCUMENTS

| EP | 0632353 A1 | 1/1995 |
| WO | 2004/011810 A1 | 2/2004 |
| WO | 2005/038613 A2 | 4/2005 |

OTHER PUBLICATIONS

International Search Report for PCT/EP2010/058994 dated Sep. 6, 2010.

(Continued)

*Primary Examiner* — Manuel Rivera Vargas
(74) *Attorney, Agent, or Firm* — Sughrue Mion, PLLC

(57) ABSTRACT

The invention pertains to a method for predicting a failure in the rotation of the rotor of a vacuum pump, comprising the following steps:
  sequences of events related to the change over time of the vacuum pump functional signals are recorded (101),
  a match is sought between at least one sequence of events and at least one pre-established association rule precursory pattern of a vacuum pump behavior model within the recorded sequences of events, said pre-established association rule's precursory patterns involving a failure in the rotor rotation (102), and
  a time prediction window is deduced during which a failure in the rotor rotation will occur in a vacuum pump (103).

(Continued)

Figure 1:
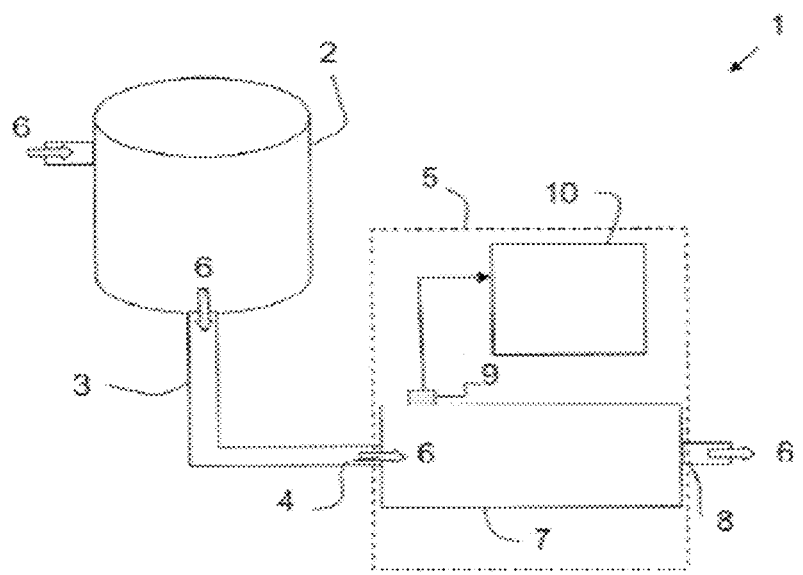

The invention also pertains to a pumping device comprising:
a vacuum pump (7) comprising at least one rotor and one pump body, said rotor having the potential to be driven rotationally within said pump body by a motor of said pump (7),
a functional signal sensor (9) of said pump (7), and
a means of predicting (10) a time prediction window during which a failure in the rotor rotation will occur in the vacuum pump (7), said means for prediction (10) calculating the predictive time window based on measurements provided by said functional signal sensor (9).

5 Claims, 3 Drawing Sheets

(51) Int. Cl.
*F04D 27/00* (2006.01)
*G01H 1/00* (2006.01)
*G01H 1/14* (2006.01)
*G05B 23/02* (2006.01)

(52) U.S. Cl.
CPC ............ *G01H 1/14* (2013.01); *G05B 23/0245* (2013.01); *G05B 23/0283* (2013.01); *F04C 2220/10* (2013.01); *F04C 2270/07* (2013.01); *F04C 2270/12* (2013.01); *F04C 2270/80* (2013.01)

(58) Field of Classification Search
USPC ......................................................... 702/183
See application file for complete search history.

(56) References Cited

U.S. PATENT DOCUMENTS

| | | |
|---|---|---|
| 6,326,758 B1 * | 12/2001 | Discenzo ...................... 318/609 |
| 6,757,665 B1 * | 6/2004 | Unsworth et al. .............. 706/15 |
| 6,954,713 B2 * | 10/2005 | Eryurek ....................... 702/140 |
| 2002/0138217 A1 | 9/2002 | Shen et al. |
| 2003/0009311 A1 * | 1/2003 | Ushiku ................. F04B 49/065 |
| | | 702/184 |
| 2004/0143418 A1 | 7/2004 | Ushiku et al. |
| 2008/0059120 A1 | 3/2008 | Xiao et al. |
| 2009/0043530 A1 * | 2/2009 | Sittler et al. .................. 702/141 |

OTHER PUBLICATIONS

Hong Kyu Han et al, Sequential association rules for forecasting failure patterns of aircrafts in Korean airforce, Expert Systems with Applications, Oxford, GB, vol. 36, No. 2, Mar. 1, 2009, pp. 1129-1133, XP025680630.

Wikipedia Association Rule Learning, XP-002597762 retrieved from Internet Aug. 24, 2010.

* cited by examiner

METHOD FOR PREDICTING A ROTATION FAULT IN THE ROTOR OF A VACUUM PUMP, AND ASSOCIATED PUMPING DEVICE

CROSS REFERENCE TO RELATED APPLICATIONS

This application is a National Stage of International Application No. PCT/EP2010/058994, filed on Jun. 24, 2010, which claims priority from French Patent Application No. 09/03125, filed on Jun. 26, 2009, the contents of all of which are incorporated herein by reference in their entirety.

The present invention pertains to the field of the predictive and preventive maintenance of a vacuum pump associated with a process chamber. It more particularly pertains to tracking sensor signals coming from the vacuum pump and making it possible to predict a failure owing to the pump seizing in order to make it possible to schedule preventive maintenance operations. The invention further extends to the associated pumping device.

Vacuum pumps generally comprise one or more rotors which, while operating, are driven by a motor in order to turn inside the pump body (the stator). During the rotation, the gas sucked from the process chamber is trapped within the free space between the rotor and the stator, in order to be discharged towards the outlet.

Vacuum pumps are particularly used in methods for manufacturing semiconductors, flat screens, or photovoltaic substrates, which require pressure lower than atmospheric pressure. However, the gases used in these methods may turn into solid byproducts which may deposit in layer form onto the moving and fixed parts of the pump, and lead to clogging and then seizing of the pump, which may cause the mechanism to stop owing to excessive friction of the rotor against the stator.

Other sources may be the cause of the seizing of the vacuum pump. For example, heat-related seizing may occur after the rotor becomes warped from the effect of becoming heated. Likewise, a fault in the rotor balance or alignment when the vacuum pump is being installed or manufactured may lead to the rotor becoming unbalanced and seizing of the vacuum pump. Additionally, when the vacuum pump has roller bearings, their degradation may also be a source of the seizing of the rotor(s) within the stator.

The seizing of the pump may cause irreversible damage to the product while manufacturing is underway within the associated process chamber (for example, a semiconductor wafer), as well as to the vacuum pump. It is then unavoidable to interrupt the processing taking place within the chamber in order to proceed to the vacuum pump replacement. The costs incurred by these unscheduled interruptions in production are considerable.

Today, the maintenance of vacuum pumps is based both on corrective and preventive actions, with the best situation being to be able to predict preventive maintenance before the vacuum pump fails and shuts off.

To do so, preventive maintenance operations are carried out at a frequency defined based on the application the vacuum pump is being used for. However, the frequency is not tailored to the actual conditions of using the pump, which may vary based on the production load, and may directly impact the worn or clogging speed of the pump, causing needless or even late maintenance operations.

Vacuum pump failure prediction methods have been developed in order to try to predict the seizing of the pump and to anticipate its replacement.

For example, a failure prediction method is known for determining the time within which a failure will occur in a dry vacuum pump. The estimate of the vacuum pump use time before failure is carried out by making a statistical study of the pump specifications (current, temperature, vibrations, etc.) combined with the characteristics of the fabrication process (gas flow, pressure, temperature of the substrate, etc.). However, this method is not autonomous. It cannot predict the lifespan of the pump without taking into account the process operating conditions. The analysis system depends on information provided by the production equipment, which requires the installation of a communication line between the equipment and the vacuum pump. Additionally, changing the process conditions then requires modifying the analysis system model, which cannot easily be done while the vacuum pumps are being used.

A method for predicting a vacuum line failure is also known from document EP 1,754,888. In this method, the change over time of a first functional parameter relating to the pump motor and a second functional parameter relating to the pump gas exhaust system are both measured. The functional parameters that are measured are then correlated by statistical processing so as to predict the time of use of the vacuum pump before clogging occurs. The vacuum line is thereby capable of conducting a self-diagnosis without any correlation with outside signals. This method is particularly well-suited to tracking the progress of the phenomenon of pollution by solid products inside the vacuum line which lead to pump clogging. However, predicting the abnormal behavior of the vacuum pump in the event of seizing through clogging only occurs shortly before the failure. It is then not always possible to take action before the vacuum pump shuts off. Furthermore, this process does not make it possible to predict other seizing-related malfunctions of the pump, such as those caused by heating or a manufacturing or installation defect.

The problem is therefore predicting the occurrence of a seizing-related vacuum pump failure in order to schedule preventive maintenance for the purpose of preventing the pump from failing while it is being used.

The problem is also identifying abnormal behavior of the vacuum pump without any indication of the treatment process taking place within the process chamber. It must be possible to carry out the failure prediction independent of the knowledge of the vacuum pump conditions of use, particularly related to the various pumped gas flows, the nature of the pumped gases, the durations of use, or in other words, without consideration for the particular conditions and parameters other than those coming from the vacuum pump.

Additionally, the prediction must be reliable. In other words, the failure prediction must have a possibility of occurring with a sufficient degree of confidence to predict failures in more than 50% of situations, if not more than 80% of situations. Additionally, the prediction must occur sufficiently early to enable the scheduling of preventive maintenance.

To that end, the purpose of the invention is a method for predicting a failure in the rotation of the rotor of a vacuum pump, comprising the following steps:
  sequences of events related to the change over time of the vacuum pump functional signals are recorded,
  a match is sought between at least one sequence of events and at least one precursor pattern of a pre-established association rule of the vacuum pump behavior model within the recorded sequences of events, said association rules being established by extracting knowledge with the restriction of one or more extraction parameters and said precursory pattern of pre-established association rule involving a failure in the rotor rotation, and a time prediction window is deduced during which a failure in the rotor rotation will occur in the vacuum pump.

The failure prediction method thereby makes it possible to reliably predict the occurrence of a failure due to the vacuum pump seizing based on the change over time of the recorded functional signals. It is then possible to schedule preventive maintenance anticipating the failure of the pump before it actually fails while it is being used. The diagnostic is early, which makes it possible to minimize damage related to the deterioration of components and facilitate the maintenance operators monitoring work, and therefore further reduce maintenance costs.

According to a first embodiment of the prediction method, sequences of events related to the change over time of vibration signals of pump body of the vacuum pump are recorded.

According to a second embodiment of the prediction method, sequences of events related to the change over time of the vacuum pump motor current signals are recorded.

The functional signals may be transformed into a frequency spectrum and frequency bands may be selected around frequencies characteristic of the vacuum pump kinematics within said spectrum.

The pump body vibration signals and the vacuum pump motor current signals are raw signals, meaning that they are derived directly from the vacuum pump and do not come from combining other signals, as may be the case, for example, for the pump power. These signals are therefore more accurate and directly reflect the state of the pump.

Additionally, the transformation of the vibration signals or current signals into a spectrum makes it possible to study periodic phenomena which characterize the operation of a vacuum pump rotating at a fixed speed.

Association rules may be established describing the vacuum pump behavior model by extracting knowledge from a learning database comprising a plurality of sequences of events, obtained from a set of vacuum pumps over the vacuum pumps life span running from when operation begins to when the rotor rotation fails.

The vacuum pump behavior model is then established based on sequences of events recorded over several days, which enables it to be independent of the occasional conditions of the treatment process that may be taking place within the process chamber. As the disruptions caused by the treatment process may last only a few minutes, they become transparent for establishing the model.

The prediction process therefore makes it possible to identify abnormal behavior in the vacuum pump, on the one hand with no indication of the process taking place within the process chamber, and on the other hand without being affected by disruptions or modifications to the process. The machine behavior model does not need to be readjusted based on how the treatment process proceeds.

According to one or more characteristics of the prediction method, taken singly or in combination, said association rules are extracted with the limitation of one or more extraction parameters chosen from among: the support, confidence, and maximum duration between each event of the association rule, one or more association rules are extracted from N−1 sequences of events from the learning database, recorded from N vacuum pumps, and said association rules are verified over the sequence of events which was not used for extraction, from said learning database, a sequence of events is determined, first by the selection from among said frequency bands of a reference level and intermediate operating levels corresponding to a multiple of the reference level, and characteristic of the vacuum pump operation, and second, by a duration characteristic of said levels.

Another purpose of the invention is a pumping device comprising:

a vacuum pump comprising at least one rotor and one pump body, said rotor having the potential to be driven rotationally within said pump body by a motor of said pump, a sensor of said pump functional signals, and a means for predicting a time prediction window during which a failure in the rotor rotation will occur in the vacuum pump, said means for prediction being configured to implement a method for predicting a failure in the rotation of a vacuum pump rotor as previously described in order to calculate the predictive time window based on measurements provided by said functional signal sensor.

According to a first embodiment of the pumping device, the functional signal sensor is a vibration sensor, for example one fixed onto a bearing of said pump body.

According to a second embodiment of the pumping device, the functional signal sensor is a means for measuring the vacuum pump motor current.

The use of a pumping device comprising a means for prediction that provide a diagnosis makes it possible to avoid major failures, by predicting them, when the installation which the vacuum pump is part of is in an active production phase.

Figure 2:
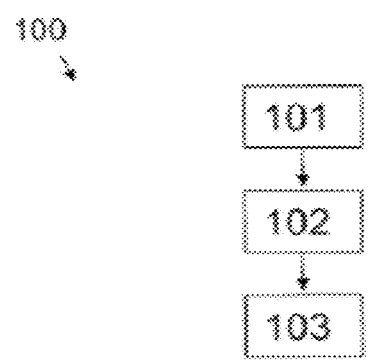
Figure 3:
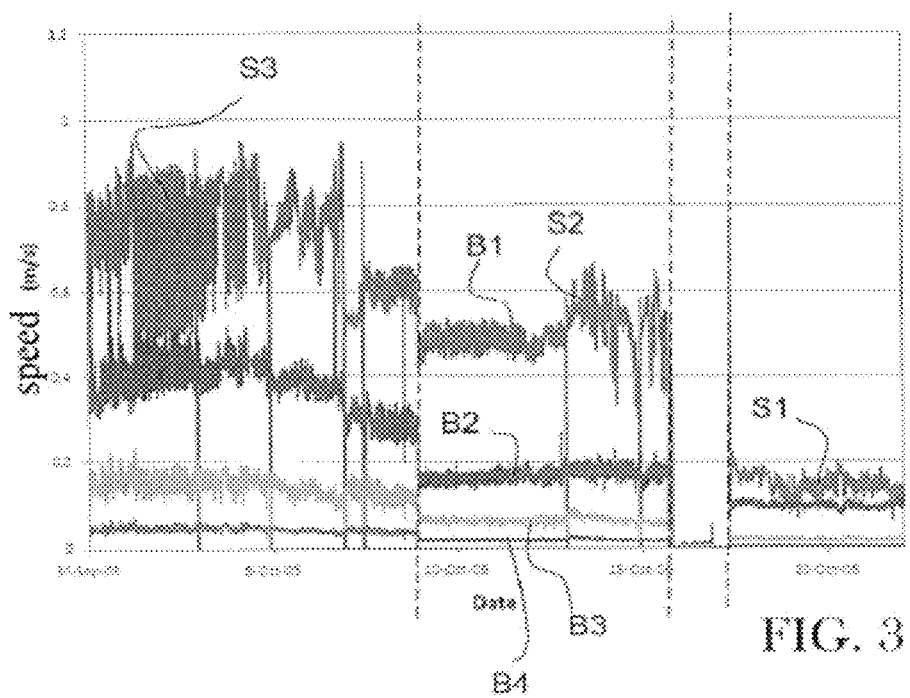
Figure 4:
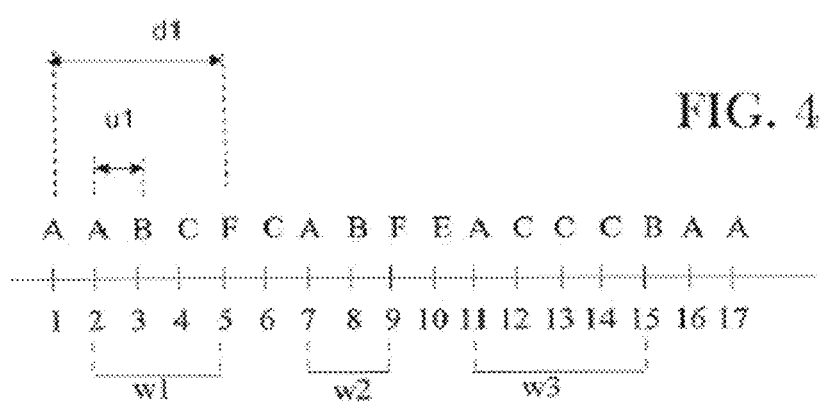
Figure 5:
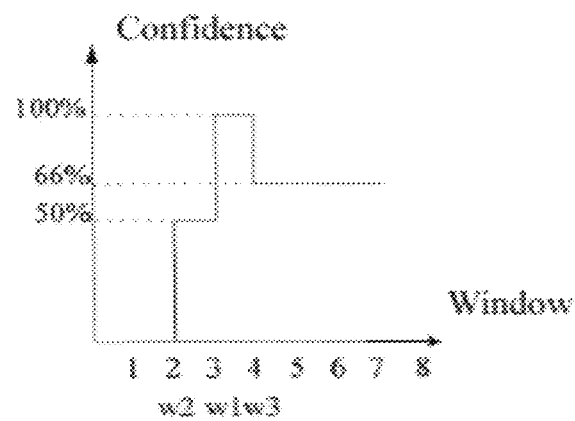
Figure 6:
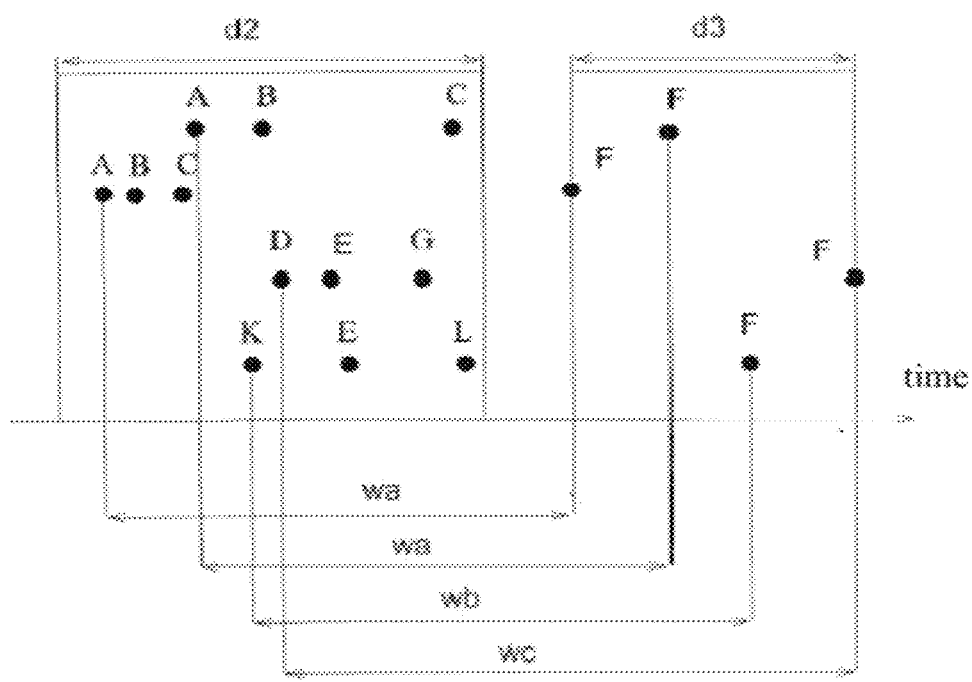

Other advantages and features will emerge from reading the following description of a particular embodiment of the invention, albeit one which is in no way limiting, as well as the appended drawings, in which:

FIG. 1 depicts a schematic view of an installation comprising a process chamber connected to a pumping device, FIG. 2 depicts a diagram of the failure prediction method, FIG. 3 shows a graph representing the vibration signals over multiple frequency bands of vibrations as a function of time for an example sequence of events, FIG. 4 symbolically depicts another example sequence of events, FIG. 5 depicts a graph of the confidence percentage as a function of the size of the optimal window, and FIG. 6 illustrates a graph of an example sequence of events as a function of time and an associated predictive time window.

In these figures, identical elements bear the same reference numbers.

For clarity purpose, the stages of the method are numbered starting from 100.

The invention applies to all types of vacuum pump comprising a rotor driven rotationally within a stator of the pump body. The vacuum pump may, for example, be one with rotating lobes, such as a roots vacuum pump, with two or three lobes. In roots vacuum pumps, each pump stage comprises two rotors with identical profiles, rotating within the stator in opposite directions. When they rotate, the sucked-in gas is trapped inside the open space found between the rotors and the stator, and is then discharged through the exhaust towards the outlet or the next stage. The rotating-lobe vacuum pump may also be a two-claw vacuum pump, also known as a claw pump. Furthermore, the vacuum pump may also be molecular, turbomolecular, or hybrid, or a rotary vane pump or screw-type pump.

The installation 1 depicted in FIG. 1 comprises a process chamber 2 connected by a tube 3 to the inlet 4 of a pumping device 5 for pumping the gases drawn from the chamber 2, in the flow direction depicted by the arrows 6. It may be a chamber 2 in which any treatment process is being carried out, for example depositing, etching, ionic implanting, or heat-treatment processes used in the manufacture of microelectronic devices on silicon wafers, or flatscreens or photovoltaic substrate.

The pumping device 5 comprises a vacuum pump 7 exhibiting a pump body within which a rotor may be driven rotationally by a motor of the pump 7 (not depicted). While operating, the rotational velocity of the rotor is regulated to a fixed value. The outlet of the vacuum pump 7 is connected to an exhaust tube.

The pumping device 5 further comprises a vibration sensor 9 of the pump body and a prediction means 10 of a predictive time window during which failure owing to seizing will occur in the pump 7. Seizing is defined as a failure in the rotational movement of the rotor inside the pump body, which may cause the rotational mechanism to stop.

The vibration sensor 9 may, for example, be a piezoelectric accelerometer that makes it possible to provide effective vibrational speeds (in m/s). The output of the vibration sensor 9 is connected to the prediction means 10.

Analyzing the vibrations makes it possible to identify periodic characteristic phenomena necessary to predict the seizing of the vacuum pump rotating at a fixed speed. Given the rigid structure of the pump body, a single vibration sensor 9 may suffice to collect all of the pump body characteristic vibration phenomena at a single measuring point. The analog output of the vibration sensor 9 is transformed by a Fourier transform into a spectrum, in order to identify periodic phenomena.

The vibration sensor 9 may, for example, be fixed onto one of the two bearings of the vacuum pump 7, as it is there that the stress of the rotors is transmitted to the pump body. More specifically, in the example of the dry vacuum roots pump, the vibration sensor is placed vertically on the upper surface of the pump body, roughly between the two rotors, where the compression stresses caused by the shafts of the rotors against the pump body are the highest.

The means of prediction 10 calculates the predictive time window during which failure owing to seizing will occur in the vacuum pump 7, based on the measurement of the change over time of the vibration signals provided by the vibration sensor 9. The means of prediction 10 comprises a processing unit located on the vacuum pump 7 level or located remotely within a dedicated expert center. The processing unit may, for example, transfer the prediction information to a pump monitoring server. The server may then in turn send a message to the maintenance operator monitoring device.

In order to calculate the predictive time window during which failure owing to seizing will occur, the means of prediction 10 implements the failure prediction method 100 depicted in FIG. 2.

In a first step 101 of the prediction method 100, sequences of events related to the change over time of the vibration signals of the pump body are recorded based on measurements taken, for example, every 80 seconds.

In order to reduce the size of the learning database, vibrations frequency bands are selected within the vibration spectrum around frequencies characteristic of the vacuum pump kinematics. FIG. 3 depicts the vibration signals (in speed) for four vibration frequency bands B1, B2, B3 and B4.

For example, a vibration frequency band is selected that is centred on the characteristic frequency corresponding to the rotor rotational speed.

It may also be planned to select a vibration frequency band around the characteristic frequency corresponding to the geometry of the rotating mechanical parts (such as the shafts, lobes, roller bearings, and gears).

A vibration frequency band may also be selected around one or more harmonics of the pump rotational frequency, which may for example be characteristic of a rotor imbalance or misalignment of the rotor shafts The sequences of events are characterized first by levels of vibration signals selected from among the frequency bands and second by characteristic durations spent at said vibration levels.

For example, sequences of events may be measured over four characteristic durations: 2 hours, 2 days, 1 week, and more than 1 week.

For example, a reference level and intermediate operating levels are determined. The levels are, for example, determined by averaging the envelope of signals over a predetermined duration.

Three examples of frequency band levels S1, S2, S3 of the vibration signals coming from the vibration sensor are depicted in curve B1 in FIG. 3.

Reference level S1 corresponds to the low threshold of the vibration signals evaluated over a characteristic duration of about 24 hours, for example in order to overcome occasional disturbances that may for example be related to the treatment process currently underway.

The measurement of the reference level S1 begins at least 24 hours after the start of a new vacuum pump in order to overcome the burn-in period of the vacuum pump 7, during which the vibration levels have not yet stabilized.

The first intermediate operating level S3 corresponding to the upper threshold of the vibration signals is, for example, about four times the reference level S1 (see FIG. 3). It is, for example, measured over a characteristic duration of about 2 hours. This duration makes it possible to overcome other occasional disturbances which may, for example, be related to the treatment process currently underway (lasting about a few minutes).

The second intermediate operating level S2 represents three times the reference level S1 and is, for example, measured over a characteristic duration of about 2 hours.

A first intermediate operating level S3 observed during one week followed by a second intermediate level S2 observed during two days, corresponds for example to the event F of the vacuum pump seizing.

In a second step 102 of the prediction method 100, a match is sought between at least one sequence of events and at least one precursor pattern of pre-established association rule precursor pattern of a vacuum pump behavior model within the recorded sequences of events, the association rules being established by extracting knowledge with the restriction of one or more extraction parameters.

The association rules have the format: "if precursor pattern then result". They involve a failure in the rotor rotation. They are denoted according to the formula (1):

$$3\theta\alpha => F \qquad (1)$$

wherein:

"α" is the precursory pattern comprising a sequence of events A, B, C . . . , each event being spaced apart in time by a maximum preset duration and imposed by the maximum duration between the last event of the precursory pattern and the seizing event. The maximum duration between events is set, for example, to 10 days. The sequence of events of the originating event is denoted according to formula (2), $$A \rightarrow B, \quad :(2):$$

Where A is the first event followed by B, the second event;
"F" is the result of failure in the rotor rotation, it is the seizing event, and
"=>" is an if-then operator between the precursory pattern and the result.

According to one embodiment, association rules describing the behavior model of the vacuum pump 7 are established by extracting knowledge from a learning database.

The purpose of the method of extracting knowledge from data or knowledge discovery in database (KDD), including the method called "data mining", is to extract learning or knowledge from large quantities of data, through automated or semi-automated methods. This method makes it possible to use the data that is available in the databases to identify a characteristic pattern, combinations, and unrecognized and significant structure/arrangements by using one or more association rules. This method is iterative, which makes it possible to optimize the quality of the extracted knowledge. Additionally, and contrary to other methods, the data mining method makes it possible to obtain association rules that may be interpreted by the user.

The learning database comprises a plurality of relevant sequences of events related to failure through seizing, obtained from a set of vacuum pumps and over a lifespan running from when the vacuum pump starts operating until it seizes. A sufficiently large set of vacuum pumps is considered, for example one with about sixty pumps, so as to make the events reliably relevant. A set of vacuum pumps is preferably used which will be operated under actual conditions of use, so as to observe the failure which is sought to be predicted over a full lifespan of the vacuum pump.

The learning database only comprises sequences of events obtained before a "first seizing". In reality, under actual conditions of use, whenever the seizing of the vacuum pump is predicted, the goal is to replace the vacuum pump with a new pump. It is thus needless to learn from any seizing that occurs after the first one. Consequently, in order to build the learning database, the acquisitions made between the vacuum pump startup date and the date when the first seizing of the pump is observed are selected. The first seizing is, for example, ascertained/established by an expert, who may particularly rely on the signals sent by sensors incorporated into the vacuum pump and recorded during operation, such as the power consumed by the vacuum pump motor or the gas pressure at the output of the vacuum pump. The expert may also rely on an assessment of the vacuum pump in order to clearly identify the cause of the seizing.

FIG. 4 depicts an example sequence of events recorded over several lifespans of pumps placed end-to-end. The lifespan d1 depicts, for example, a sequence of events between startup and a seizing event "F".

The association rules are extracted with the restriction of one or more extraction parameters chosen from among: support, confidence, and the maximum duration between each event of the association rule.

Support corresponds to the number of times that the association rule predicted seizing-related failure. A support at least equal to 1 is chosen, meaning that an association rule must have at least an occurrence of 1 within the detection of seizing-related failures in the learning database. A support equal to 2 may be chosen so that the extracted association roles are not too specific.

Confidence is a reliability measure of the association rule. It is expressed as a prediction % of the seizing event F. A confidence of 100% is chosen. In other words, the precursory pattern must always be followed by a seizing result in order to prevent false predictions, even though this choice tends to reduce the prediction rate. An association rule for which a seizing event is obtained nine times out of ten, for example, will be rejected.

The maximum duration between each event of the association rule is a restriction imposed by the prediction horizon, meaning by the maximum duration between the failure prediction and the occurrence of the failure itself. A maximum duration between each event of about 10 days is determined.

At the end of the learning, association rules are characterized by an optimal window, derived from the calculation, for each association rule. The optimal window is the duration of the rule resulting in the greatest level of confidence. For each association rule, the optimal window for which support is equal to 1 and confidence is 100% will be retained.

For example, for the example sequence of events in FIG. 4, for a maximum window w1 which duration is equal to 3 units of time u1, the precursory pattern A->B takes place twice. Furthermore, each time, this precursory pattern involved the seizing event F. Confidence is therefore 100%.

For a maximum window w2 whose duration is equal to two units of time u1, the precursory pattern A->B takes place twice. This precursory pattern involved the seizing event F one time out of two. The confidence is therefore 50%.

For a maximum window w3 whose duration is equal to four units of time u1, the precursory pattern A->B takes place three times. However, this precursory pattern involved the seizing event F only two times out of three. The confidence is therefore 66%.

The graph in FIG. 5 summarizes these three possibilities by depicting the confidence percentage as a function of the duration of the window. It is observed that for a window w1 which duration is 3 units, the confidence is at its maximum when, for a window w2, w3 of shorter or longer duration, the confidence is less. In other words, there is an optimal window w1 for which the confidence is maximum.

One or more association rules are then extracted (in general a set of association rules) from N−1 sequences of events from the learning database recorded from N vacuum pumps, and the association rules are verified against the sequence of events which was not used for extraction.

This approach makes it possible to test the robustness of the established association rules. A valid association rule must make it possible to predict or not predict a malfunction over all of the remaining sequences of events which were not used to establish the association rule, satisfying the same restrictions as during extraction. This method makes it possible to build the most generic possible construct behavior models and to verify the operation of the method over an independent sequence of events (still unused).

This method is then repeated N times to determine other association rules, or to find the same association rules, each time leaving a new unused set for the verification of the new association rule. Each sequence is then successively isolated from the N−1 sequences of events that were used to establish an association rule in order to verify said association rule. The group of association rules extracted during the N extractions then forms a set of association rules.

During a third step 103 of the extraction process 100, a predictive time window is deduced, during which a failure in the rotor rotation will occur on the vacuum pump 7. For any occurrence of an originating event, the date of the failure is predicted by adding the size of the optimal window to the date when the first event of the association rule appears. For an observation window d2, the predictive time window d3 is equal to the interval of time between the closest failure date prediction and the most distant failure date prediction.

The observation window d2 is imposed by the rule comprising the greatest number of events (k) and is equal to (k−1) times the maximum duration between each event.

The rules established by extracting knowledge from the learning database are, for example (R1), (R2), and (R3):
(R1) A->B->C=>F, with a first optimal window wa
(R2) D->E->G=>F, with a second optimal window wc
(R3) K->E->L=>F, with a third optimal window wb.

FIG. 6 illustrates a sequence of events measured over time during the observation window d2.

The occurrence of the precursory pattern A->B->C makes it possible to predict seizing F that will occur on the date when the first event A appears, plus the size of the optimal window wa. This precursory event appeared twice during the window d2, so two dates are predicted for the occurrence of the seizing.

The occurrence of the precursory pattern D->E->G makes it possible to predict a seizing F that will occur on the date when the first event D appears, plus the size of the optimal window wc.

The occurrence of the precursory pattern K->E->L makes it possible to predict a seizing F that will occur on the date when the first event K appears, plus the size of the optimal window wb.

The cloud of points corresponding to the various assumptions of predicting the occurrence of seizing falls within the predictive time window d3 between the projection according to the optimal window wc of the rule D->E->G and the projection according to the optimal window wa of the first occurrence of rule A->B->C. A time window during which a failure in the rotor rotation will occur on the vacuum pump may then be predicted.

The prediction method therefore makes it possible to identify abnormal behavior in the vacuum pump, on the one hand with no indication of the treatment process taking place within the process chamber, and on the other hand without being affected by disruptions or modifications to the process. The machine behavior model does not need to be readjusted based on how the treatment process proceeds.

Furthermore, the prediction is reliable in more than 80% of situations. It is then possible to schedule preventive maintenance anticipating the failure of the pump before it actually fails while it is being used. The diagnostic is early, which makes it possible to minimize damage related to the deterioration of components and facilitate the maintenance operators monitoring work, and therefore further reduce maintenance costs.

The invention claimed is:

1. A method for predicting a failure in the rotation of the rotor of a vacuum pump, comprising the following steps performed by a system including a processor:
    recording sequences of events related to the change over time of functional signals of the vacuum pump,
    seeking a match between at least one sequence of events and at least one precursory pattern of pre-established association rule of a vacuum pump behavior model within the recorded sequences of events, said association rules being established by extracting knowledge, based on data mining, with the restriction of one or more extraction parameters and said precursory patterns of pre-established association rule involving a failure in the rotor rotation, and
    deducing a time prediction window during which a failure in the rotor rotation will occur in a vacuum pump, and
    performing maintenance on said vacuum pump at a time based on said prediction window,
    wherein the functional signals may be transformed into a frequency spectrum, and frequency bands may be selected around the frequencies characteristic of the vacuum pump kinematics within said spectrum,
    wherein association rules are established describing the vacuum pump behavior model by extracting knowledge from a learning database comprising a plurality of sequences of events, obtained from a set of vacuum pumps over the vacuum pumps life span running from startup to failure of the rotor rotation, and
    wherein from said learning database, a sequence of events is determined, on the one hand by the selection from among said frequency bands of a reference level and intermediate operating levels corresponding to a multiple of the reference level, and characteristics of the vacuum pump operation, and on the other hand, by a duration characteristic of said levels.

2. A method according to claim 1, wherein said sequences of events relate to the change over time of vibration signals in the vacuum pump.

3. A method according to claim 1, wherein said sequences of events relate to the change over time of vacuum pump motor current signals.

4. A method according to claim 1, wherein said association rules are extracted with the restriction of one or more extraction parameters chosen from among: the support, confidence, and maximum duration between each event of the association rule.

5. A method according to claim 1, wherein one or more association rules are extracted from N−1 sequences of events from the learning database, recorded from N vacuum pumps, and said association rules are verified against the sequence of events which was not used for extraction.

* * * * *